US012479365B2

(12) United States Patent
Zhang et al.

(10) Patent No.: US 12,479,365 B2
(45) Date of Patent: Nov. 25, 2025

(54) AUTOMOBILE

(71) Applicants: ZHEJIANG GEELY HOLDING GROUP CO., LTD., Hangzhou (CN); GEELY AUTOMOBILE RESEARCH INSTITUTE (NINGBO) CO., LTD, Ningbo (CN)

(72) Inventors: Min Zhang, Hangzhou (CN); Kaihong Dai, Hangzhou (CN); Wei Zhang, Hangzhou (CN); Hongbin Ran, Hangzhou (CN); Weilong Ling, Hangzhou (CN); Yali Qiu, Hangzhou (CN); Shujian Zhang, Hangzhou (CN)

(73) Assignees: ZHEJIANG GEELY HOLDING GROUP CO., LTD., Hangzhou (CN); GEELY AUTOMOBILE RESEARCH INSTITUTE (NINGBO) CO., LTD., Ningbo (CN)

( * ) Notice: Subject to any disclaimer, the term of this patent is extended or adjusted under 35 U.S.C. 154(b) by 0 days.

(21) Appl. No.: 18/407,687

(22) Filed: Jan. 9, 2024

(65) Prior Publication Data
US 2024/0253566 A1 Aug. 1, 2024

(30) Foreign Application Priority Data
Jan. 29, 2023 (CN) .......................... 202310043917.9

(51) Int. Cl.
*B60R 1/26* (2022.01)
*B60R 1/12* (2006.01)
(Continued)

(52) U.S. Cl.
CPC ................. *B60R 1/26* (2022.01); *B60R 1/12* (2013.01); *G06F 3/012* (2013.01); *G06F 3/013* (2013.01);
(Continued)

(58) Field of Classification Search
None
See application file for complete search history.

(56) References Cited

U.S. PATENT DOCUMENTS 10,486,600 B1 11/2019 Havskjold et al.
2013/0229519 A1 9/2013 Kavuru
(Continued)

FOREIGN PATENT DOCUMENTS

CN 204845728 U 12/2015
CN 207594828 U 7/2018
(Continued)

OTHER PUBLICATIONS

Extended European Search Report issued in counterpart European Patent Application No. EP24151596.4, dated Jul. 1, 2024.
(Continued)

*Primary Examiner* — Talha M Nawaz
(74) *Attorney, Agent, or Firm* — Westbridge IP LLC

(57) ABSTRACT

Disclosed is an automobile, including a vehicle body and a rearview system. A vehicle cabin is provided inside the vehicle body, the vehicle body includes a roof and a tailgate directly connected to the roof, and the tailgate is made of an opaque material; the rearview system is provided on the vehicle body and including an exterior rearview mirror, an interior rearview mirror module and a first camera module, the exterior rearview mirror and the first camera module are both located outside the vehicle cabin, the interior rearview mirror module is located in the vehicle cabin, the interior rearview mirror module includes an inner rearview display screen electrically connected to the first camera module and provided with an image display mode; and in the image display mode, the inner rearview display screen is configured to display driving environment behind the automobile captured by the first camera module.

15 Claims, 3 Drawing Sheets

(51) Int. Cl.
  *G06F 3/01* (2006.01)
  *G09G 5/10* (2006.01)

(52) U.S. Cl.
  CPC ........ *G09G 5/10* (2013.01); *B60R 2001/1253* (2013.01); *B60R 2300/20* (2013.01); *B60R 2300/404* (2013.01); *G09G 2320/0606* (2013.01); *G09G 2320/0626* (2013.01); *G09G 2330/023* (2013.01); *G09G 2354/00* (2013.01); *G09G 2360/144* (2013.01); *G09G 2380/10* (2013.01)

(56) References Cited

U.S. PATENT DOCUMENTS

| | | |
|---|---|---|
| 2013/0229522 A1 | 9/2013 | Schofield et al. |
| 2018/0151152 A1 | 5/2018 | Hirosawa et al. |
| 2019/0118717 A1 | 4/2019 | Blank et al. |
| 2019/0168669 A1 | 6/2019 | Lintz et al. |
| 2021/0055547 A1* | 2/2021 | Rao .......... G09G 3/36 |
| 2021/0088784 A1* | 3/2021 | Whitmire ........ G02B 27/0101 |
| 2021/0173480 A1* | 6/2021 | Osterhout ......... G06F 3/04815 |
| 2022/0083794 A1* | 3/2022 | Bronte ............ G06F 3/017 |
| 2023/0205314 A1* | 6/2023 | Kawagoe ........... B60K 35/29 345/156 |
| 2023/0286379 A1* | 9/2023 | Steel ............ G10L 25/51 |
| 2023/0353670 A1* | 11/2023 | Nieri ........... H04M 1/724634 |
| 2023/0356728 A1* | 11/2023 | Jain ............ G06F 3/013 |
| 2024/0037964 A1* | 2/2024 | Roche ............ G06N 20/00 |
| 2024/0198798 A1* | 6/2024 | Shishavan ........... B60K 35/29 |
| 2024/0223734 A1* | 7/2024 | Sobecki ............ H04N 7/183 |
| 2024/0223888 A1* | 7/2024 | Koh ............... H04N 23/62 |
| 2025/0115215 A1* | 4/2025 | Hilborn ........... B60S 1/56 |

FOREIGN PATENT DOCUMENTS

| | | |
|---|---|---|
| CN | 109484304 A | 3/2019 |
| CN | 110803107 A | 2/2020 |
| EP | 2743133 A2 | 6/2014 |
| GB | 2542408 A | 3/2017 |
| JP | 2016052814 A | 4/2016 |
| JP | 2016055801 A | 4/2016 |
| JP | 2017047868 A | 3/2017 |
| KR | 20160039997 A | 4/2016 |
| WO | 2019081828 A1 | 5/2019 |

OTHER PUBLICATIONS

Communication about intention to grant a European patent issued in counterpart European Patent Application No. EP 24151596.4, dated Apr. 16, 2025.

Request for the Submission of an Opinion issued in counterpart Korean Patent Application No. KR 10-2023-0189052, dated May 23, 2025.

First Office Action issued in counterpart Chinese Patent Application No. 202310043917.9, dated Sep. 25, 2025.

\* cited by examiner

AUTOMOBILE

CROSS-REFERENCE TO RELATED APPLICATIONS

This application claims priority to Chinese Patent Application No. 202310043917.9, filed on Jan. 29, 2023, the entire contents of which are incorporated herein by reference.

TECHNICAL FIELD

The present application relates to the technical field of automobiles, and in particular to an automobile.

BACKGROUND

Rearview system of the traditional automobile is usually composed of automotive exterior rearview mirror, interior rearview mirror and rear windshield. The principle of optical reflection is used to provide the driver with a rear visual field of the vehicle, so such automobile are required to have a rear window of a certain size. Otherwise, the rear visual field of the automobile will be small, resulting in blind spots of the visual field, and items such as rear seat headrests will also increase the blind spots of the visual field. Moreover, the existence of the rear window has great restrictions on the vehicle models and appearance design, making the automobile lack a sense of technology and mystery.

SUMMARY

The main purpose of the present application is to propose an automobile, aiming to improve the visual field of the interior rearview mirror and reduce the restrictions of the rearview system on vehicle models.

In order to achieve the above objects, the automobile proposed by the present application includes:
  a vehicle body, a vehicle cabin is provided inside the vehicle body, the vehicle body includes a roof and a tailgate, the tailgate is directly connected to the roof, and the tailgate is made of an opaque material;
  a rearview system provided on the vehicle body and including an exterior rearview mirror, an interior rearview mirror module and a first camera module; and the exterior rearview mirror and the first camera module are both located outside the vehicle cabin, the interior rearview mirror module is located in the vehicle cabin, the interior rearview mirror module includes an inner rearview display screen, the inner rearview display screen is electrically connected to the first camera module and provided with an image display mode; and in the image display mode, the inner rearview display screen is configured to display driving environment behind the automobile captured by the first camera module.

In an embodiment, the inner rearview display screen is further provided with a specular reflection mode; and in the specular reflection mode, the inner rearview display screen is configured to reflect a rear row situation of the vehicle cabin at least.

In an embodiment, the rearview system further includes a control module electrically connected to the inner rearview display screen, and the control module is configured to control display brightness of the inner rearview display screen according to ambient light information.

In an embodiment, the rearview system further includes a photosensitive sensor electrically connected to the control module and/or a time acquisition module electrically connected to the control module, the control module is further configured to obtain the ambient light information according to the photosensitive sensor, and/or estimate the ambient light information according to time information obtained by the time acquisition module.

In an embodiment, the rearview system further includes a control module electrically connected to the inner rearview display screen, and the control module is configured to control on/off of the image display mode according to a direction of driver's gaze; and
  in response to that the driver's gaze is directed toward the inner rearview display screen, the image display mode is turned on; or in response to that the driver's gaze is not directed toward the inner rearview display screen, the image display mode is turned off to save energy consumption of the rearview system.

In an embodiment, the rearview system further includes a gaze detection device electrically connected to the control module, the gaze detection device has a preset gaze range, and the control module is further configured to obtain the direction of the driver's gaze according to a human eye captured by the gaze detection device falling into a gaze range; and/or
  the rearview system further includes a second camera module electrically connected to the control module, the second camera module is configured to capture driver's head turning information, and the control module is further configured to estimate the direction of the driver's gaze according to the driver's head turning information captured by the second camera module.

In an embodiment, the rearview system further includes a control module electrically connected to the inner rearview display screen, and the control module is configured to determine that the inner rearview display screen is in the image display mode when the automobile is in a braking state according to braking information.

In an embodiment, the rearview system further includes a brake pedal electrically connected to the control module and/or an acceleration sensor electrically connected to the control module, the control module is further configured to obtain the braking information according to an opening value of the brake pedal, and/or obtain the braking information according to the acceleration sensor.

In an embodiment, the rearview system further includes a control module electrically connected to the inner rearview display screen, the control module is configured to determine that the inner rearview display screen is in the image display mode when the automobile is in a reversing state according to reversing information.

In an embodiment, the rearview system further includes a gear converter electrically connected to the control module and/or a direction sensor electrically connected to the control module, the control module is further configured to obtain the reversing information according to that the gear converter being converted to a reverse gear, and/or obtain the reverse information according to the direction sensor.

In an embodiment, the inner rearview display screen is further provided with a split-screen mode; in the split-screen mode, the inner rearview display screen is provided with a first partition and a second partition, the first partition is in the image display mode, and the second partition is in the specular reflection mode.

In an embodiment, the rearview system further includes a control module electrically connected to the inner rearview display screen, and the control module is configured to determine that the inner rearview display screen is in the split-screen mode when the automobile is in a turning state or a lane-changing state according to steering information.

In an embodiment, the rearview system further includes a turn light electrically connected to the control module and/or a steering sensor electrically connected to the control module, the control module is further configured to obtain the steering information according to an activation of the turn light, and/or obtain the steering information according to the steering sensor.

In an embodiment, the inner rearview display screen is further provided with a split-screen mode; in the split-screen mode, the inner rearview display screen is provided with a first partition and a second partition, the first partition is in the image display mode, and the second partition is in the specular reflection mode; and the vehicle cabin is further provided with a control panel configured to allow a driver to directly control the inner rearview display screen to switch among the image display mode, the specular reflection mode and the split-screen mode.

In an embodiment, the vehicle body further includes a steering wheel and an instrument panel, and the control panel is provided on the interior rearview mirror module and/or the steering wheel and/or the instrument panel.

In an embodiment, the first camera module is provided on a top of the vehicle body or a rear of the vehicle body and is disposed toward the rear of the automobile.

In an embodiment, the first camera module is provided on the tailgate; and/or
  the vehicle body includes a rear light, and the first camera module is provided on the rear light; and/or
  the vehicle body includes a rear bumper, and the first camera module is provided on the rear bumper.

The technical solution of the present application is to set up a vehicle body and a rearview system, a vehicle cabin is provided inside the vehicle body, the vehicle body includes a roof and a tailgate, the tailgate is directly connected to the roof, and the tailgate is made of an opaque material; the rearview system is provided on the vehicle body and including an exterior rearview mirror, an interior rearview mirror module and a first camera module, the exterior rearview mirror and the first camera module are both located outside the vehicle cabin, the interior rearview mirror module is located in the vehicle cabin, the interior rearview mirror module includes an inner rearview display screen, the inner rearview display screen is electrically connected to the first camera module, and the first camera module can at least capture the driving environment behind the automobile, so that the rearview system is not limited by vehicle models, thereby making the vehicle models and appearance design more diversified, and improving the overall sense of mystery and technology of the automobile. It can also expand the driver's visual field and reduce the possibility of visual blind spots. Besides, the inner rearview display screen is provided with an image display mode, in the image display mode, the inner rearview display screen is configured to display driving environment behind the automobile captured by the first camera module. This allows the driver to directly observe the rear driving environment of the automobile through the inner rearview display screen, which not only conforms to the driver's observation habit of observing the rear driving environment, but also avoids the need to set up an additional display screen, thereby saving space inside the vehicle cabin.

BRIEF DESCRIPTION OF THE DRAWINGS

In order to explain the embodiments of the present application or the technical solutions in the existing technology more clearly, the accompanying drawings needed to be used in the description of the embodiments or the existing technology will be briefly introduced below. Obviously, the accompanying drawings in the following description are only some embodiments of the present application, other accompanying drawings can be obtained based on the provided accompanying drawings without exerting creative efforts for those of ordinary skill in the art.

The realization of the purpose, functional features and advantages of the present application will be further described in conjunction with the embodiments and with reference to the accompanying drawings.

DETAILED DESCRIPTION OF THE EMBODIMENTS

The technical solutions in the embodiments of the present application will be clearly and completely described below in conjunction with the accompanying drawings in the embodiments of the present application. Obviously, the described embodiments are only some of the embodiments of the present application, but not all of the embodiments. Based on the embodiments of the present application, all other embodiments obtained by those of ordinary skill in the art without any creative work fall within the scope of the present application.

It should be noted that, if there are directional instructions (such as up, down, left, right, front, back or the like) involved in the embodiments according to the present application, the directional indications are only used to explain the relative positional relationship, movement and so on between various components in a specific posture (as shown in the accompanying drawings). If the specific posture changes, the directional indication will also change accordingly.

In addition, in the embodiments according to the present application, if there are descriptions involving "first", "second" or the like, the descriptions of "first", "second" or the like are only for descriptive purposes and cannot be understood as indicating or implying the relative importance or implicitly indicating the quantity of the technical features indicated. Therefore, features defined as "first" and "second" may explicitly or implicitly include at least one of these features. In addition, the meaning of "and/or" appearing in the entire text includes three parallel solutions, taking "A and/or B" as an example, it includes solution A, or solution B, or a solution that satisfies both A and B at the same time. In addition, the technical solutions of various embodiments can be combined with each other, but it must be based on that those of ordinary skill in the art can realize. When the combination of technical solutions is contradictory or cannot be realized, it should be considered that such combination of technical solutions does not exist and is not within the protection scope claimed by the present application.

The present application proposes an automobile.

Figure 1:
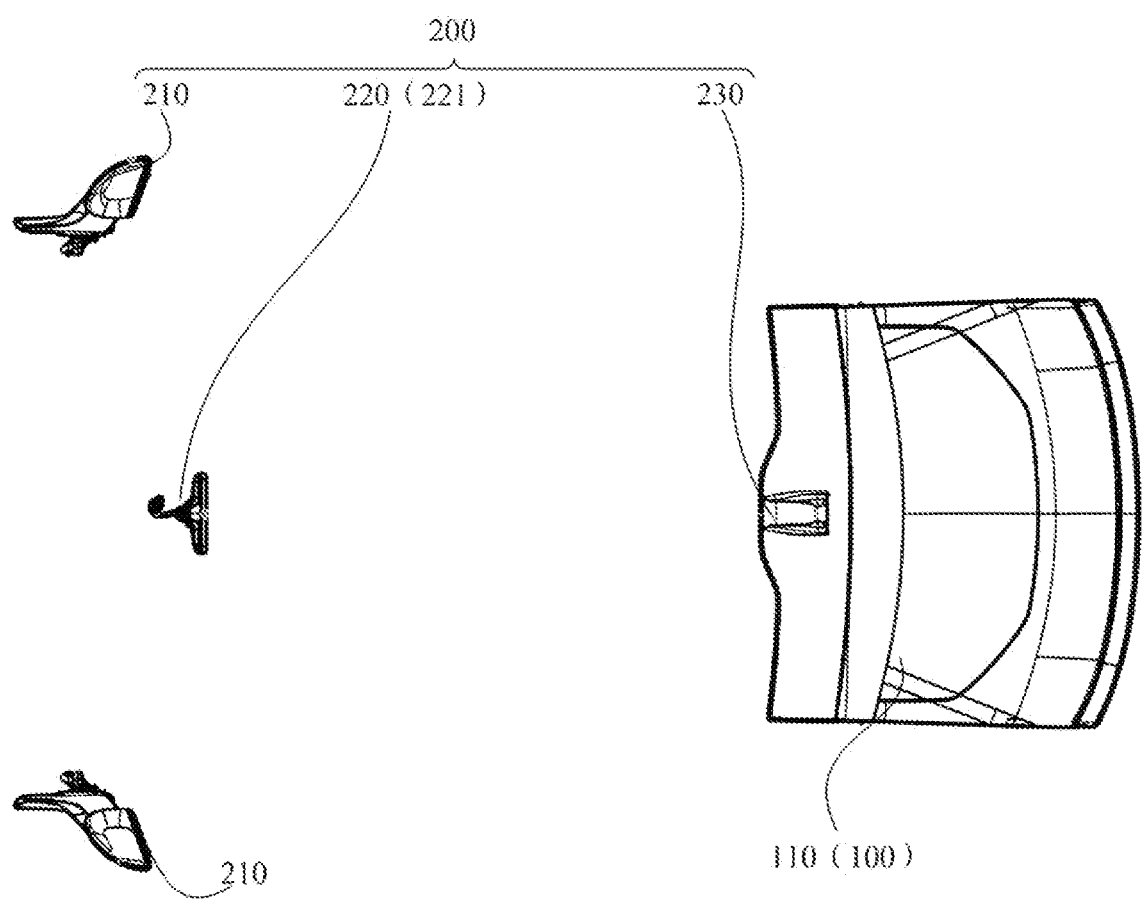
FIG. 1 is a structural schematic view of a rearview system of an automobile from a perspective according to an embodiment of the present application.
Figure 2:
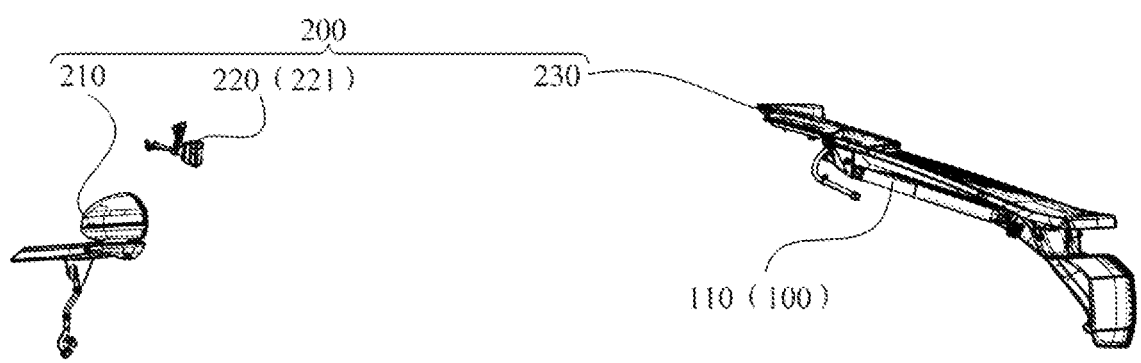
FIG. 2 is a structural schematic view of the rearview system of the automobile in FIG. 1 from another perspective.

In an embodiment of the present application, as shown in FIG. 1 and FIG. 2, the automobile includes a vehicle body 100 and a rearview system 200, a vehicle cabin is provided inside the vehicle body 100, the vehicle body 100 includes a roof and a tailgate 110, the tailgate 110 is directly connected to the roof, and the tailgate is made of an opaque material; the rearview system 200 is provided on the vehicle body 100 and including an exterior rearview mirror 210, an interior rearview mirror module 220 and a first camera module 230, the exterior rearview mirror 210 and the first camera module 230 are both located outside the vehicle cabin, the interior rearview mirror module 220 is located in the vehicle cabin, the interior rearview mirror module 220 includes an inner rearview display screen 221, the inner rearview display screen 221 is electrically connected to the first camera module 230 and provided with an image display mode; and in the image display mode, the inner rearview display screen 221 is configured to display driving environment behind the automobile captured by the first camera module 230.

Specifically, in the prior art, the rearview system 200 generally consists of an exterior rearview mirror 210, an interior rearview mirror and a rear window, and the interior rearview mirror observes the driving environment at the rear of the automobile by means of the rear window. However, limited by certain vehicle models of the automobiles, the rear of the automobile is not provided with a rear window or the area of the rear window is very small, which may cause the interior rearview mirror to lose effectiveness or the sight line to be blocked, and items such as rear seat headrests can also block the sight line of the rearview mirror to some extent. In this case, the rear window must be large enough. The existence of rear window will have certain limitations on the vehicle models, especially the exterior modeling of the vehicle is more restrictive, which will easily lead to a reduction in the overall sense of mystery and technology of the automobile. Therefore, in this solution, directly discarding the rear window of the automobile, thus making the tailgate 110 of the automobile directly rotationally mounted on the roof of the automobile, so as to make the vehicle models and the appearance design of the automobile more diversified, thereby improving the overall sense of mystery and technology of the automobile. And the first camera module 230 is provided outside the vehicle cabin, and the inner rearview display screen 221 is electrically connected to the first camera module 230, and the first camera module 230 is at least capable of capturing the driving environment at the rear of the automobile, which is not only free from the restrictions of vehicle models, but also can expand the driver's visual field and reduce the possibility of visual blind spots. And the interior rearview mirror module 220 is configured as inner rearview display screen 221, which allows the driver to directly observe the rear driving environment of the automobile through the inner rearview display screen, which not only conforms to the driver's observation habit of observing the rear driving environment, but also avoids the need to set up an additional display screen, thereby saving space inside the vehicle cabin.

In an embodiment, the first camera module 230 is provided on a top of the vehicle body 100 or a rear of the vehicle body 100 and is disposed toward the rear of the automobile. In this solution, since no rear window glass is provided on the vehicle body 100, the rear of the vehicle is an opaque state. Such a setting can realize a variety of automobile shapes, but the driver cannot directly observe the driving condition behind the automobile through the interior rearview mirror, so it is necessary to install the first camera module 230 on the top of the vehicle body 100 or the rear of the vehicle body 100, thus, on the one hand, there has a larger mounting space and is convenient for the installation of the first camera module 230, and on the other hand, a better visual field can also be ensured. Certainly, in other embodiments, the first camera module 230 can also be installed in other positions on the automobile, such as on the exterior rearview mirror 210 or on the door handle on the vehicle door.

When the first camera module 230 is provided on the rear of the vehicle body 100, in an embodiment, the first camera module 230 is provided on the tailgate 110.

In another embodiment, the vehicle body 100 includes a rear light, and the first camera module 230 is provided on the rear light.

In yet another embodiment, the vehicle body 100 includes a rear bumper, and the first camera module 230 is provided on the rear bumper.

The technical solution of the present application is to set up a vehicle body 100 and a rearview system 200, a vehicle cabin is provided inside the vehicle body 100, the vehicle body 100 includes a roof and a tailgate 110, the tailgate 110 is directly connected to the roof, and the tailgate 110 is made of an opaque material; the rearview system 200 is provided on the vehicle body 100 and including an exterior rearview mirror 210, an interior rearview mirror module 220 and a first camera module 230, the exterior rearview mirror 210 and the first camera module 230 are both located outside the vehicle cabin, the interior rearview mirror module 220 is located in the vehicle cabin, the interior rearview mirror module 220 includes an inner rearview display screen 221, the inner rearview display screen 221 is electrically connected to the first camera module 230, and the first camera module 230 can at least capture the driving environment behind the automobile, so that the rearview system 200 is not limited by vehicle models, thereby making the vehicle models and appearance design more diversified, and improving the overall sense of mystery and technology of the automobile. It can also expand the driver's visual field and reduce the possibility of visual blind spots. And the inner rearview display screen 221 is provided with an image display mode, in the image display mode, the inner rearview display screen 221 is configured to display driving environment behind the automobile captured by the first camera module 230. This allows the driver to directly observe the rear driving environment of the automobile through the inner rearview display screen 221, which not only conforms to the driver's observation habit of observing the rear driving environment, but also avoids the need to set up an additional display screen, thereby saving space inside the vehicle cabin.

In an embodiment, the inner rearview display screen 221 is further provided with a specular reflection mode; and in the specular reflection mode, the inner rearview display screen 221 is configured to reflect a rear row situation of the vehicle cabin at least. Specifically, the inner rearview display screen 221 also has a specular reflection mode, that is, the inner rearview display screen 221 has both the specular reflection function of the interior rearview mirror of the prior art and the image display function, thereby adapting to a variety of vehicle models and facilitating automobile styling adjustment. Besides, in the specular reflection mode, the inner rearview display screen 221 is configured to reflect the rear row situation of the vehicle cabin at least. When the automobile has a rear window, the inner rearview display screen 221 can both observe the rear driving environment of the automobile and reflect the rear row situation of the vehicle cabin; when the automobile does not have a rear window, the inner rearview display screen 221 is configured to reflect the rear row situation of the vehicle cabin.

Figure 3:
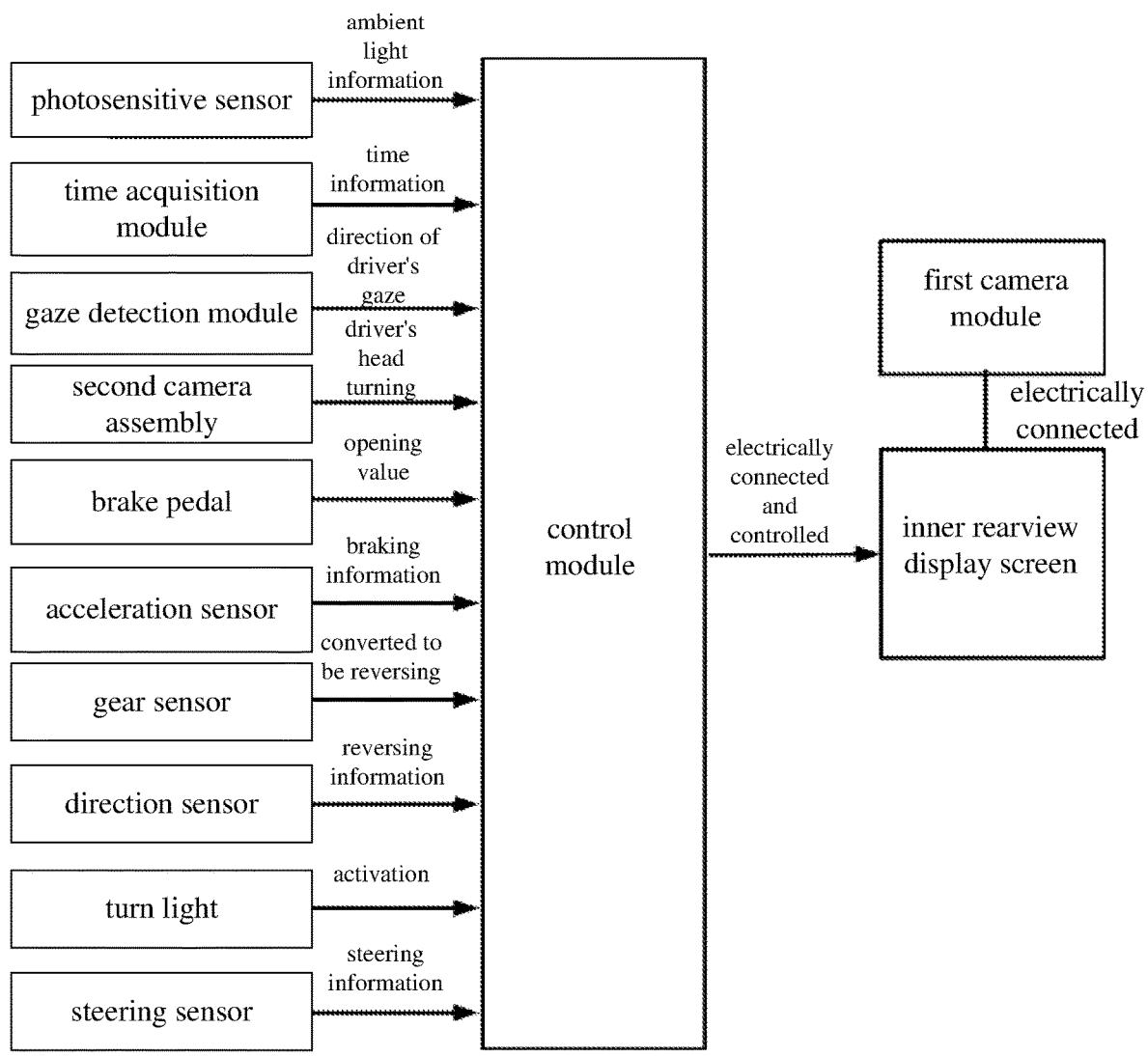
FIG. 3 is a working principle diagram of the rearview system of the automobile in FIG. 1.

Referring to FIG. 3, in the first embodiment, the rearview system 200 further includes a control module electrically connected to the inner rearview display screen 221, and the control module is configured to control display brightness of the inner rearview display screen 221 according to ambient light information. Specifically, the control module is capable of controlling the display brightness of the inner rearview display screen 221, and when in the daytime, the light is sufficient, the control module automatically increases the display brightness of the inner rearview display screen 221; and when in the nighttime, the light is darker, the control module automatically decreases the display brightness of the inner rearview display screen 221. It not only saves the power consumption of inner rearview display screen 221, but also protects the driver's eyes and facilitates the driver to observe the driving environment behind the automobile.

Furthermore, the rearview system 200 further includes a photosensitive sensor electrically connected to the control module and/or a time acquisition module electrically connected to the control module, the control module is further configured to obtain the ambient light information according to the photosensitive sensor, and/or estimate the ambient light information according to time information obtained by the time acquisition module. Specifically, the photosensitive sensor is capable of sensing the strength of the ambient light, then transmits the signal to the control module, and the control module reacts and controls the display brightness of the inner rearview display screen 221. Alternatively, the time acquisition module transmits the acquired time to the control module, and the control module estimates the change in light brightness according to the time change, and then reacts and controls the display brightness of the inner rearview display screen 221.

In a second embodiment, the rearview system 200 further includes a control module electrically connected to the inner rearview display screen 221, and the control module is configured to control on/off of the image display mode according to a direction of driver's gaze.

In response to that the driver's gaze is directed toward the inner rearview display screen 221, the image display mode is turned on; or in response to that the driver's gaze is not directed toward the inner rearview display screen 221, the image display mode is turned off to save energy consumption of the inner rearview display screen 221.

Specifically, the control module may control the turning on or turning off of the image display mode of the inner rearview display screen 221 according to the direction of the driver's gaze. In response to that the driver's gaze is directed toward the inner rearview display screen 221, the control module controls the inner rearview display screen 221 to be in the image display mode; if the driver's gaze is not directed toward the inner rearview display screen 221, the control module controls the inner rearview display 221 to be converted from the image display mode to the specular reflection mode, thereby saving the power consumption of the inner rearview display screen 221 and improving the intelligence level of the inner rearview display screen 221.

Furthermore, the rearview system 200 further includes a gaze detection device electrically connected to the control module, the gaze detection device has a preset gaze range, and the control module is further configured to obtain the direction of the driver's gaze according to a human eye captured by the gaze detection device falling into a gaze range. Specifically, the gaze detection device has a preset gaze range, and the driver's eyes or driver's sight line is captured by the gaze detection device when the driver's eyes or driver's sight line falls into the gaze range, and the information is transmitted to the control module, and the control module reacts and controls the inner rearview display screen 221 to be in image display mode; when the human eye leaves the gaze range for a preset time, the control module reacts and controls the inner rearview display screen 221 to switch from image display mode to specular reflection mode.

In another embodiment, the rearview system 200 further includes a second camera module electrically connected to the control module, the second camera module is configured to capture driver's head turning information, and the control module is further configured to estimate the direction of the driver's gaze according to the driver's head turning information captured by the second camera module. Specifically, the second camera module is capable of capturing the driver's head turning information, when the second camera module captures that the driver's head turning angle is greater than or equal to a preset angle, it will transfer the information to the control module, the control module reacts and controls the inner rearview display screen 221 to be in the image display mode; after the second camera module captures the preset time for the driver's head to turn back to its original position, the control module reacts and controls the inner rearview display screen 221 to switch from the image display mode to the specular reflection mode.

Referring to FIG. 3 again, in a third embodiment, the rearview system 200 further includes a control module electrically connected to the inner rearview display screen 221, and the control module is configured to determine that the inner rearview display screen 221 is in the image display mode when the automobile is in a braking state according to braking information. Specifically, when the automobile is in a braking state and the control module has acquired the braking information, the control module reacts to ensure that the inner rearview display screen 221 is in the image display mode, so that the driver can observe the driving condition behind the automobile captured by the first camera module 230 from the inner rearview display screen 221, thereby expanding the driver's visual field, and facilitating the driver to observe the driving condition behind the automobile in a timely manner.

Furthermore, the rearview system 200 further includes a brake pedal electrically connected to the control module and/or an acceleration sensor electrically connected to the control module, the control module is further configured to obtain the braking information according to an opening value of the brake pedal, and/or obtain the braking information according to the acceleration sensor. Specifically, when the opening value of the brake pedal during braking is greater than or equal to a preset opening value, the brake pedal transmits a signal to the control module, the control module calculates that the automobile is in a braking state after signal processing, and the control module reacts and controls the inner rearview display screen 221 to change to the image display mode. A period of time after the end of braking, the rearview system 200 may automatically change from the image display mode to the specular reflection mode, thereby saving the power consumption of the inner rearview display screen 221 and improving the intelligence level of the rearview system 200.

In a fourth embodiment, the rearview system 200 further includes a control module electrically connected to the inner rearview display screen 221, the control module is configured to determine that the inner rearview display screen 221 is in the image display mode when the automobile is in a reversing state according to reversing information. Specifically, when the automobile is in the state of reversing and the control module acquires the reversing information, the control module reacts and ensures that the inner rearview display screen 221 is in the image display mode, so that the driver can observe the driving condition behind the automobile captured by the first camera module 230 from the inner rearview display screen 221, thereby expanding the visual field of the driver and facilitating the driver to observe the driving condition behind the automobile in a timely manner.

Furthermore, the rearview system further includes a gear converter electrically connected to the control module and/or a direction sensor electrically connected to the control module, the control module is further configured to obtain the reversing information according to that the gear converter being converted to a reverse gear, and/or obtain the reverse information according to the direction sensor. Specifically, when the gear converter is converted to reverse gear, the gear converter transmits a signal to the control module, the control module calculates that the automobile is in a reversing state after signal processing, and the control module reacts and controls the inner rearview display screen 221 to change to the image display mode; and/or, when the direction sensor senses a change in the direction of the vehicle speed (a sudden change to a negative value), the direction sensor transmits the signal to the control module, the control module reacts and controls the inner rearview display screen 221 to change to the image display mode. A period of time after the end of reversing, the rearview system 200 can automatically change from the image display mode to the specular reflection mode, thereby saving the power consumption of the inner rearview display screen 221 and improving the intelligence level of the rearview system 200.

Referring to FIG. 3 again, in the fourth embodiment, the inner rearview display screen 221 is further provided with a split-screen mode; in the split-screen mode, the inner rearview display screen 221 is provided with a first partition and a second partition, the first partition is in the image display mode, and the second partition is in the specular reflection mode. Specifically, that is the inner rearview display screen 221 has a split-screen mode, when in the split-screen mode, the inner rearview display screen 221 is divided into two display areas which are the first partition and the second partition, the first partition is the image display mode, the driver can observe the driving environment behind the automobile from the first partition; the second partition is the specular reflection mode, the driver can observe the rear row situation of the automobile from the second partition, assisting the first partition to observe the driving environment around the automobile; thereby ensuring that drivers are able to carry out the overall control to the driving environment around the automobile from all angles, expanding the visual field of drivers and ensuring that drivers can react to unexpected situations in a timely manner.

Furthermore, the rearview system 220 further includes a control module electrically connected to the inner rearview display screen 221, and the control module is configured to determine that the inner rearview display screen 221 is in the split-screen mode when the automobile is in a turning state or a lane-changing state according to steering information. Specifically, when the automobile needs to carry out turning or lane-changing, after the control module obtains the steering information, the control module reacts to ensure that the inner rearview display screen 221 is in the split-screen mode, thereby expanding the visual field of drivers, ensuring that drivers are able to carry out the overall control to the driving environment around the automobile from all angles, expanding the visual field of drivers and ensuring that drivers can react to unexpected situations in a timely manner.

Furthermore, the rearview system 200 further includes a turn light electrically connected to the control module and/or a steering sensor electrically connected to the control module, the control module is further configured to obtain the steering information according to an activation of the turn light, and/or obtain the steering information according to the steering sensor. Specifically, when the activation of the turn light, the turn light transmits a signal to the control module, the control module calculates that the automobile is in a turning state after signal processing, the control module reacts and controls the inner rearview display screen 221 from the specular reflection mode or the image display mode to the split-screen mode; and/or, when the steering sensor senses the change of the driving direction of the automobile, the direction sensor transmits the signal to the control module, the direction sensor reacts and controls the switch from the specular reflection mode or the image display mode to the split-screen mode. A period of time after the end of the turning or the lane changing of the automobile, the rearview system 200 can automatically cancel the split-screen mode and changes to the image display mode or the specular reflection mode.

In an embodiment, the inner rearview display screen 221 is further provided with a split-screen mode; in the split-screen mode, the inner rearview display screen 221 is provided with a first partition and a second partition, the first partition is in the image display mode, and the second partition is in the specular reflection mode.

The vehicle cabin is further provided with a control panel configured to allow a driver to directly control the inner rearview display screen 221 to switch among the image display mode, the specular reflection mode and the split-screen mode.

Specifically, the control panel is capable of directly controlling the inner rearview display screen 221 to switch among the image display mode, the specular reflection mode and the split-screen mode, and there is no need for signal processing by the control module. Thus, when the control module fails or there is no signal processing, the driver can also realize the switch of the inner rearview display screen 221 among different modes, thereby reducing the occurrence of the situation in which the inner rearview display cannot be used normally due to the failure of the control module. For example, when the control module controls the on/off of the image display mode according to the direction of the driver's gaze, it requires the driver's eyes or sight line to fall within the gaze range and/or the angle of rotation of the driver's head to be greater than or equal to the preset angle, so as to be detected by the gaze detection device and/or the second camera assembly, and then complete the switch between the image display mode and the specular reflection mode. When the gaze detection device and/or the second camera assembly and/or the control module fails, it is difficult to ensure that the switching between the image display mode and the specular reflection mode is completed. Or when the driver needs to switch to the split-screen mode in a non-turning situation, it cannot be realized directly, so the control panel is set up, so that the driver can complete the switch among the image display mode, the specular reflection mode and the split-screen mode according to the actual needs. In other embodiments, the control module can also be Bluetooth-connected to a terminal device such as a mobile phone, so that the driver can directly make the inner rearview display screen 221 switch among the image display mode, the specular reflection mode, and the split-screen mode through the settings of a mobile phone and other terminals.

In the embodiment, the control panel is provided in the vehicle cabin. Furthermore, the vehicle body 100 further includes a steering wheel and an instrument panel, and the control panel is provided on the interior rearview mirror module 220 and/or the steering wheel and/or the instrument panel. Specifically, thereby facilitating operation of the driver, the inner rearview display screen 221 is timely completed to switch among the image display mode, specular reflection mode and split-screen mode.

The above are only some embodiments of the present application, and are not intended to limit the scope of the present application. Under the application concept of the present application, any equivalent structure transformation made by using the description and accompanying drawings of the present application, or directly or indirectly applied in other related technical fields, is included within the scope of the present application.

What is claimed is:

1. An automobile, comprising:
a vehicle body, wherein a vehicle cabin is provided inside the vehicle body, the vehicle body comprises a roof and a tailgate, the tailgate is directly connected to the roof, and the tailgate is made of an opaque material; and
a rearview system provided on the vehicle body and comprising an exterior rearview mirror, an interior rearview mirror module and a first camera module,
wherein the exterior rearview mirror and the first camera module are both located outside the vehicle cabin, the interior rearview mirror module is located in the vehicle cabin, the interior rearview mirror module comprises an inner rearview display screen, the inner rearview display screen is electrically connected to the first camera module and provided with an image display mode;
in the image display mode, the inner rearview display screen is configured to display driving environment behind the automobile captured by the first camera module;
the inner rearview display screen is further provided with a specular reflection mode;
in the specular reflection mode, the inner rearview display screen is configured to reflect a rear row situation of the vehicle cabin at least;
the rearview system further comprises a control module electrically connected to the inner rearview display screen, and the control module is configured to control on/off of the image display mode according to a direction of driver's gaze;
in response to that the driver's gaze is directed toward the inner rearview display screen, the image display mode is turned on; and
in response to that the driver's gaze is not directed toward the inner rearview display screen, the image display mode is turned off to save energy consumption of the rearview system.

2. The automobile according to claim 1, wherein the rearview system further comprises a control module electrically connected to the inner rearview display screen, and the control module is configured to control display brightness of the inner rearview display screen according to ambient light information.

3. The automobile according to claim 2, wherein the rearview system further comprises a photosensitive sensor electrically connected to the control module and/or a time acquisition module electrically connected to the control module, the control module is further configured to obtain the ambient light information according to the photosensitive sensor, and/or estimate the ambient light information according to time information obtained by the time acquisition module.

4. The automobile according to claim 1, wherein the rearview system further comprises a gaze detection device electrically connected to the control module, the gaze detection device has a preset gaze range, and the control module is further configured to obtain the direction of the driver's gaze according to a human eye captured by the gaze detection device falling into a gaze range; and/or
the rearview system further comprises a second camera module electrically connected to the control module, the second camera module is configured to capture driver's head turning information, and the control module is further configured to estimate the direction of the driver's gaze according to the driver's head turning information captured by the second camera module.

5. The automobile according to claim 1, wherein the rearview system further comprises a control module electrically connected to the inner rearview display screen, and the control module is configured to determine that the inner rearview display screen is in the image display mode when the automobile is in a braking state according to braking information.

6. The automobile according to claim 5, wherein the rearview system further comprises a brake pedal electrically connected to the control module and/or an acceleration sensor electrically connected to the control module, the control module is further configured to obtain the braking information according to an opening value of the brake pedal, and/or obtain the braking information according to the acceleration sensor.

7. The automobile according to claim 1, wherein the rearview system further comprises a control module electrically connected to the inner rearview display screen, the control module is configured to determine that the inner rearview display screen is in the image display mode when the automobile is in a reversing state according to reversing information.

8. The automobile according to claim 7, wherein the rearview system further comprises a gear converter electrically connected to the control module and/or a direction sensor electrically connected to the control module, the control module is further configured to obtain the reversing information according to that the gear converter being converted to a reverse gear, and/or obtain the reverse information according to the direction sensor.

9. The automobile according to claim 1, wherein the inner rearview display screen is further provided with a split-screen mode; in the split-screen mode, the inner rearview display screen is provided with a first partition and a second partition, the first partition is in the image display mode, and the second partition is in the specular reflection mode.

10. The automobile according to claim 9, wherein the rearview system further comprises a control module electrically connected to the inner rearview display screen, and the control module is configured to determine that the inner rearview display screen is in the split-screen mode when the automobile is in a turning state or a lane-changing state according to steering information.

11. The automobile according to claim 10, wherein the rearview system further comprises a turn light electrically connected to the control module and/or a steering sensor electrically connected to the control module, the control module is further configured to obtain the steering information according to an activation of the turn light, and/or obtain the steering information according to the steering sensor.

12. The automobile according to claim 1, wherein the inner rearview display screen is further provided with a split-screen mode; in the split-screen mode, the inner rearview display screen is provided with a first partition and a second partition, the first partition is in the image display mode, and the second partition is in the specular reflection mode; and the vehicle cabin is further provided with a control panel configured to allow a driver to directly control the inner rearview display screen to switch among the image display mode, the specular reflection mode and the split-screen mode.

13. The automobile according to claim 12, wherein the vehicle body further comprises a steering wheel and an instrument panel, and the control panel is provided on the interior rearview mirror module and/or the steering wheel and/or the instrument panel.

14. The automobile according to claim 1, wherein the first camera module is provided on a top of the vehicle body or a rear of the vehicle body and is disposed toward the rear of the automobile.

15. The automobile according to claim 14, wherein the first camera module is provided on the tailgate; and/or the vehicle body comprises a rear light, and the first camera module is provided on the rear light; and/or the vehicle body comprises a rear bumper, and the first camera module is provided on the rear bumper.

* * * * *